(12) United States Patent
Bonsall

(10) Patent No.: US 6,913,432 B2
(45) Date of Patent: Jul. 5, 2005

(54) ANIMAL TRANSPORTING SYSTEM

(76) Inventor: Sandie W. Bonsall, 12349-118 Rd., Minneola, KS (US) 67865

( * ) Notice: Subject to any disclaimer, the term of this patent is extended or adjusted under 35 U.S.C. 154(b) by 0 days.

(21) Appl. No.: 10/228,630

(22) Filed: Aug. 26, 2002

(65) Prior Publication Data

US 2003/0007854 A1 Jan. 9, 2003

Related U.S. Application Data

(63) Continuation-in-part of application No. 09/717,727, filed on Nov. 20, 2000, now Pat. No. 6,439,825.
(51) Int. Cl.[7] .................................................. B60P 1/44
(52) U.S. Cl. ...................................... 414/537; 119/412
(58) Field of Search ................................ 414/537, 482; 119/400, 412, 847, 849

(56) References Cited

U.S. PATENT DOCUMENTS 4,037,564 A * 7/1977 Schrock ....................... 296/61
4,566,404 A * 1/1986 Instone et al. ................. 119/8
5,085,555 A * 2/1992 Vartanian .................... 414/537
5,829,947 A * 11/1998 Litten ......................... 414/537

FOREIGN PATENT DOCUMENTS

DE    2 9909285    *   5/1999
EP      504958    *   9/1992

* cited by examiner

Primary Examiner—Kathy Matecki
Assistant Examiner—Charles A. Fox

(57) ABSTRACT

An animal transporting system for easily loading, unloading, sorting, separating and transporting animals within an enclosed structure. The inventive device includes a frame attached to a truck, a ramp attached to the frame that is extendable from the frame, a pair of first doors pivotally attached to the frame adjacent the ramp, a pair of second doors pivotally attached to the first doors, a rear door, and a rear ramp structure telescoping rearwardly and downwardly for the loading of animals at ground level.

8 Claims, 20 Drawing Sheets

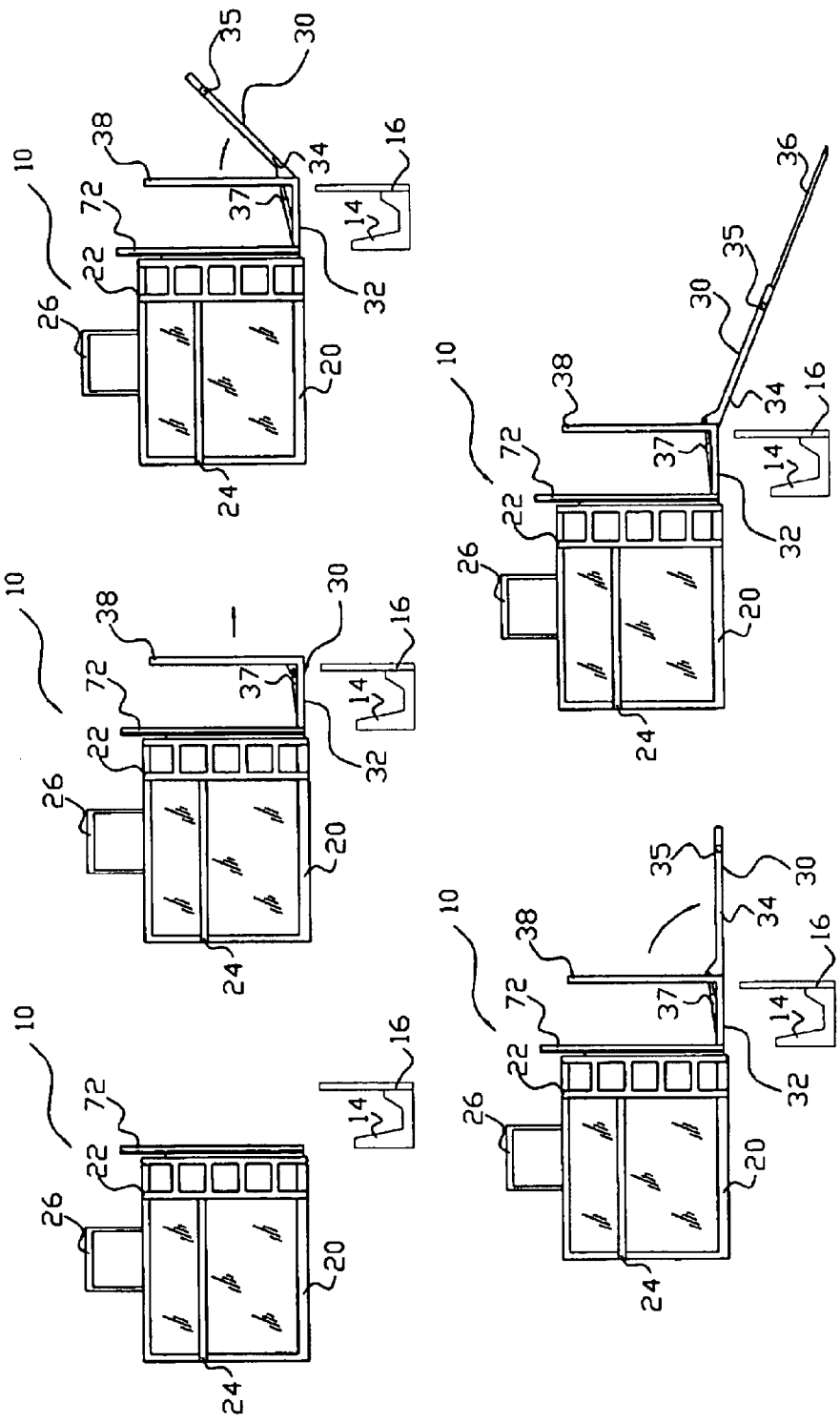

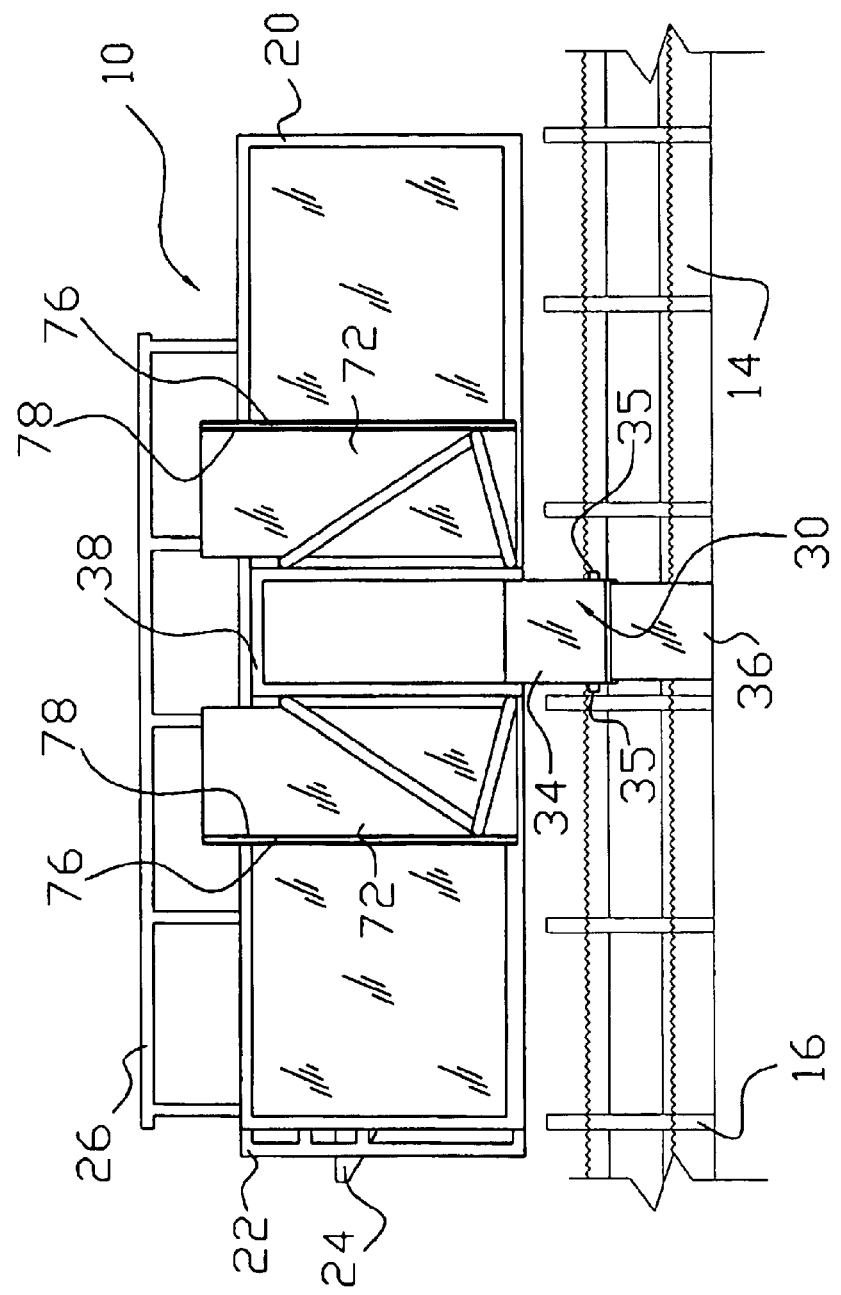

ANIMAL TRANSPORTING SYSTEM

CROSS REFERENCE TO RELATED APPLICATIONS

I hereby claim benefit under Title 35, United States Code, Section 120 of U.S. patent application Ser. No. 09/717,727 filed Nov. 20, 2000. This application is a continuation-in-part of the Ser. No. 09/717,727 application. The Ser. No. 09/717,727 application is now U.S. Pat. No. 6,439,825. The Ser. No. 09/717,727 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to animal transporting devices and more specifically it relates to an animal transporting system for easily loading, unloading, sorting and transporting animals within an enclosed structure.

2. Description of the Prior Art

Animal transporting devices have been in use for years. Typically, an animal transporting device is comprised of a ground or dock level trailer that is connected to a vehicle. Conventional animal trailers have a rear door exposing an interior portion having one or more gates for creating various sizes of holding pens for the animals.

The most significant problem with conventional animal trailers is that they generally require more than one person to load, sort, transport, and unload animals from within. Another problem is that many ground level portable fences are required to load and unload the animals from the trailer. Another problem is that gates to a feed yard pen must be opened to allow the trailer to be positioned within the interior of the feed yard pen.

While these devices may be suitable for the particular purpose to which they address, they are not as suitable for easily loading, unloading, sorting and transporting high stressed, weakened, sick, or recovering animals within an enclosed structure. Conventional animal trailers are not efficient to utilize when loading and unloading one or more animals.

In these respects, the animal transporting system according to the present invention substantially departs from the conventional concepts and designs of the prior art, and in so doing provides an apparatus primarily developed for the purpose of easily loading, unloading, sorting, and transporting animals within an enclosed structure.

SUMMARY OF THE INVENTION

In view of the foregoing disadvantages inherent in the known types of animal trailers now present in the prior art, the present invention provides a new animal transporting system construction wherein the same can be utilized for easily loading, unloading, sorting, and transporting animals within an enclosed structure with the operator removed or on the exterior of said structure.

The general purpose of the present invention, which will be described subsequently in greater detail, is to provide a new animal transporting system that has many of the advantages of the animal transporting devices mentioned heretofore and many novel features that result in a new animal transporting system which is not anticipated, rendered obvious, suggested, or even implied by any of the prior art animal transporting devices, either alone or in any combination thereof.

To attain this, the present invention generally comprises a frame attached to a truck, a horizontal deck attached to the frame that is extendable from the frame, a pair of first doors pivotally attached to the frame adjacent the horizontal deck, a pair of second doors pivotally attached to the first doors, and a rear door, and a rear ramp structure telescoping rearwardly and downwardly for the loading of animals at ground level. When the horizontal deck is fully extended, the first doors are extended from the frame along side the horizontal deck for retaining animals being loaded and unloaded from the frame. When the ramp, which is connected to the horizontal deck, is extended the second doors are extended from the first doors retaining animals being loaded or unloaded. The frame is formed for receiving one or more animals within having a plurality of partitions and inner doors which retain and direct animals depending upon whether they are closed or opened. A side door and a rear door are positioned within the frame for allowing loading and unloading animals from heightened areas such as a dock. With a level lift attachment, animals may be loaded from ground level at side and rear doors. A catwalk is attached to the upper portion of the frame for allowing an individual to view the interior portion of the frame.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an animal transporting system that will overcome the shortcomings of the prior art devices.

A second object is to provide an animal transporting system for easily loading, unloading, sorting, and transporting animals within an enclosed structure.

A further object is to provide an animal transporting system that allows for the loading and unloading of animals at ground level into the rear door thereof.

Another object is to provide an animal transporting system that does not require additional portable fences, ramps or chutes to load and unload animals from within the holding structure.

An additional object is to provide an animal transporting system that allows only one individual to load, unload, sort and transport animals.

A further object is to provide an animal transporting system that encourages free and natural movement of animals thereby requiring no outside stimulation such as electrical shockers.

Another object is to provide an animal transporting system that allows an individual to safely load, sort, separate, and unload animals.

A further object is to provide an animal transporting system that does not require an individual to enter the interior with the animals.

A further object is to provide an animal transporting system that simple in construction thereby creating a strong and durable structure.

A further object is to provide an animal transporting system that can be utilized to load and unload animals within feed yard pens without requiring a gate to be opened.

A further object is to provide an animal transporting system that allows sick animals to be transported thereby reducing stress to the animal.

A further object is to provide an animal transporting system that reduces labor costs.

A further object is to provide an animal transporting system that can be utilized within feed yards, zoos and various other locations.

A further object is to provide an animal transporting system that will sort, deliver and return animals from hospital pens within a feedlot to their home pens.

A further object is to provide a low-stress, calm, humane way to transport sick and weakened animals with minimal interaction between animals and people.

A further object is to provide an animal transporting system that allows animals to be loaded and unloaded over gates, fences, feed bunks and various other structures.

A further object is to provide an animal transporting system that can load or unload animals at a dock.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 6 is a rear view of the present invention.

FIG. 7 is a rear view of the present invention with the first portion of the ramp extended.

FIG. 8 is a rear view of the present invention with the second and third portion being pivoted outwardly with respect to the first portion.

FIG. 9 is a rear view of the present invention with the second and third portion being pivoted outwardly with respect to the first portion in a substantially horizontal position.

FIG. 10 is a rear view of the present invention with the ramp fully extended.

FIG. 11 is a left side view of the present invention with the ramp fully extended.

DESCRIPTION OF THE PREFERRED EMBODIMENT

Figure 1:
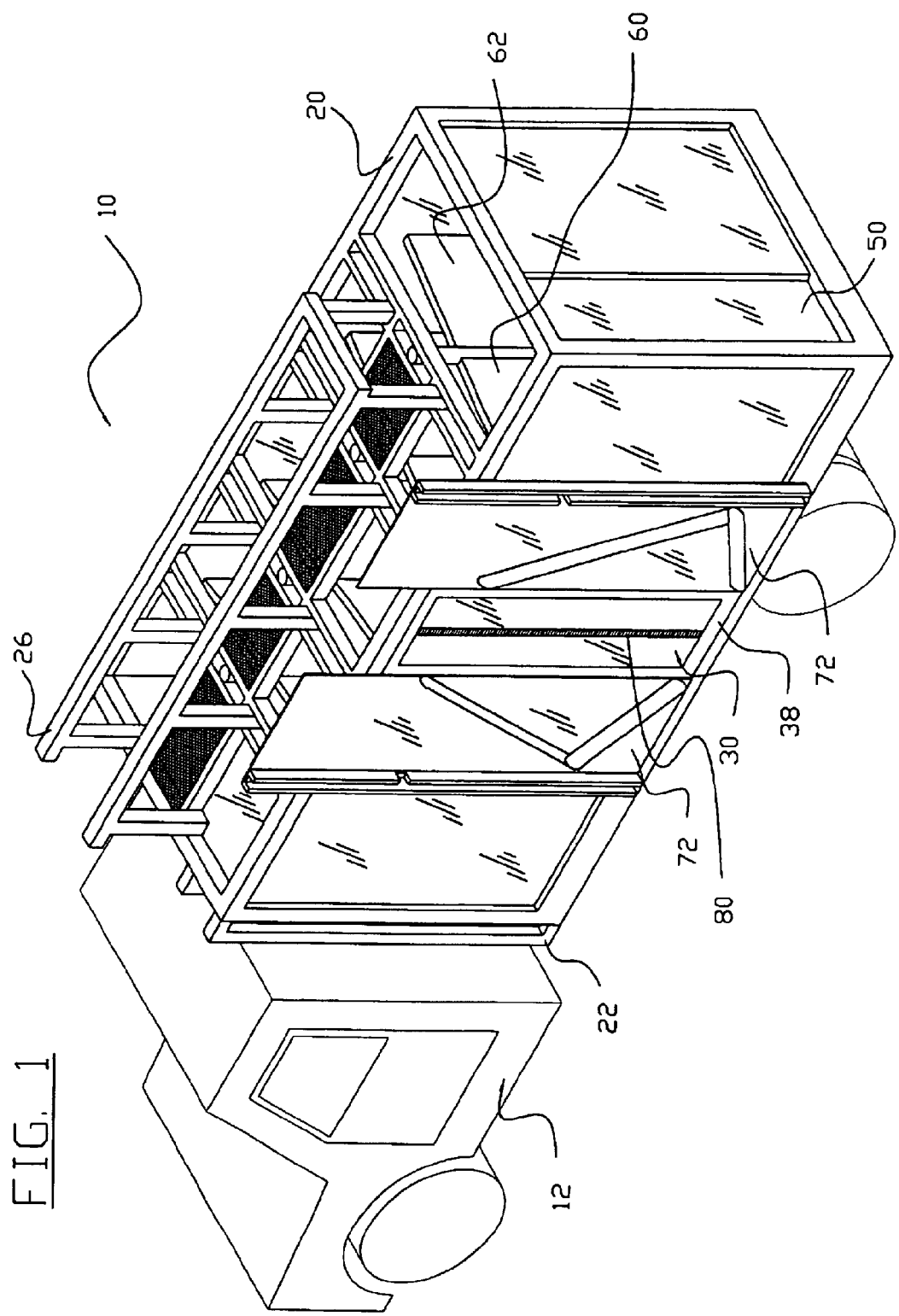
FIG. 1 is a rear upper perspective view of the present invention.

Turning now descriptively to the drawings, in which similar reference characters denote similar elements throughout the several views, FIGS. 1 through 19 illustrate an animal transporting system 10, which comprises a frame 20 attached to a truck 12, a ramp 30 attached to the frame 20 that is extendable from the frame 20, a pair of first doors 70 pivotally attached to the frame 20 adjacent the ramp 30, a pair of second doors 72 pivotally attached to the first doors 70, and a rear door 50, and a rear ramp structure telescoping rearwardly and downwardly for the loading of animals at ground level. When the ramp 30 is fully extended, the first doors 70, the deck 32, and the second doors 72 are extended from the frame 20 along side the ramp 30 for retaining animals being loaded and unloaded from the frame 20. The frame 20 is formed for receiving one or more animals within having a plurality of partitions 62 and inner doors 60. A side door 40 and a rear door 50 are positioned within the frame 20 for allowing loading and unloading animals from heightened areas such as a dock. A catwalk 26 attached to the upper portion of the frame 20 for allowing an individual to view the interior portion of the frame 20.

Figure 2:
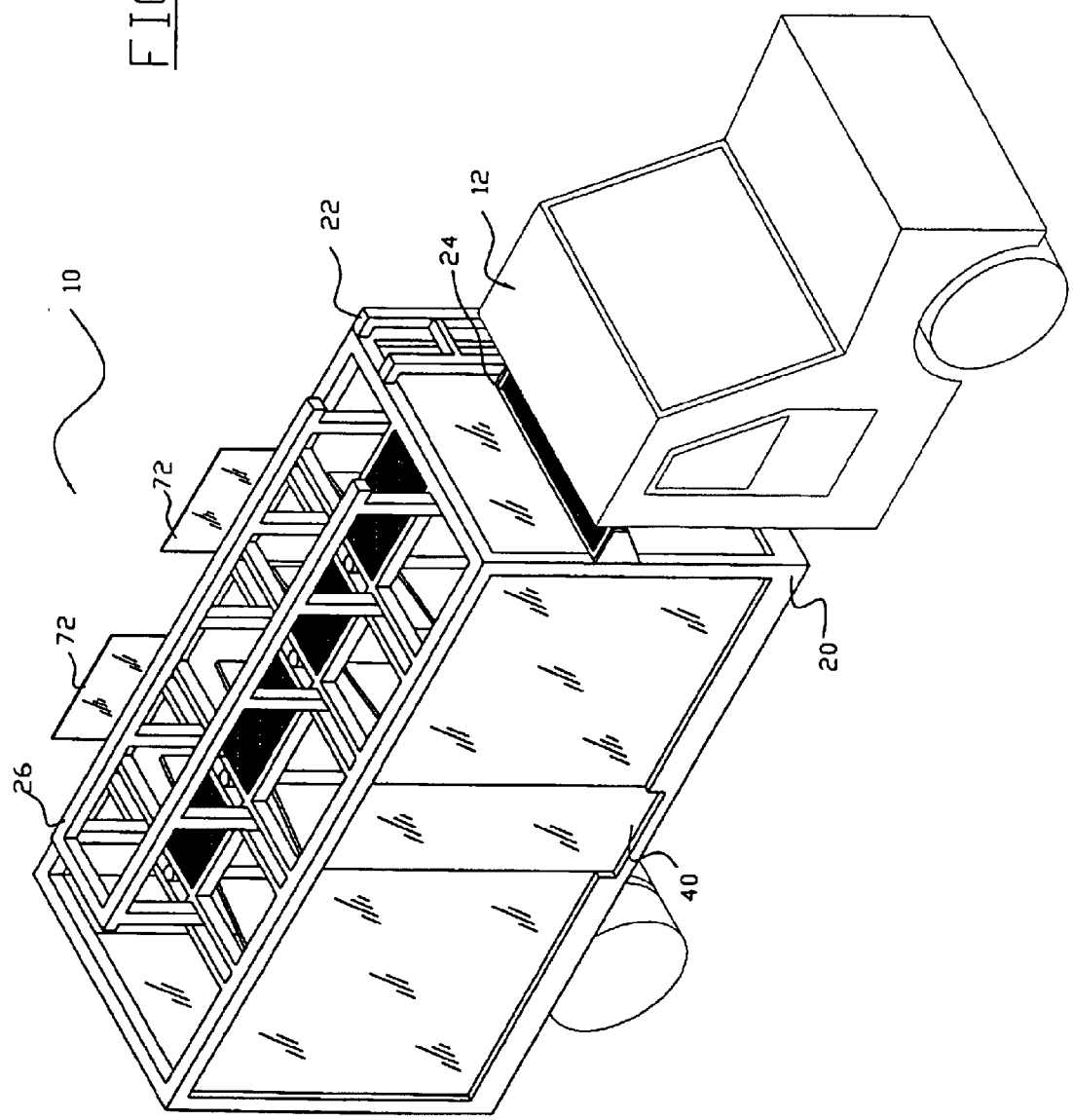
FIG. 2 is a front upper perspective view of the present invention.

As shown in FIGS. 1 and 2 of the drawings, a truck 12 or similar vehicle is provided to support the frame 20. The truck 12 may include various structures and designs as can be appreciated. The purpose of the truck 12 is to provide a self-powered device for transporting the animals contained within the structure of the frame 20. Further discussion of the truck 12 will not be pursued because the variations to the truck 12 are deemed readily apparent to one skilled in the art.

As shown in FIGS. 1 and 2 of the drawings, a frame 20 is provided that is attached to a rear portion of the truck 12. The frame 20 is self-enclosed for retaining one or more animals within. The frame 20 includes a plurality of walls that may be ventilated for the animals within. The frame 20 may be comprised of any shape, size and structure capable of receiving and storing one or more animals as can be appreciated.

Figure 3:
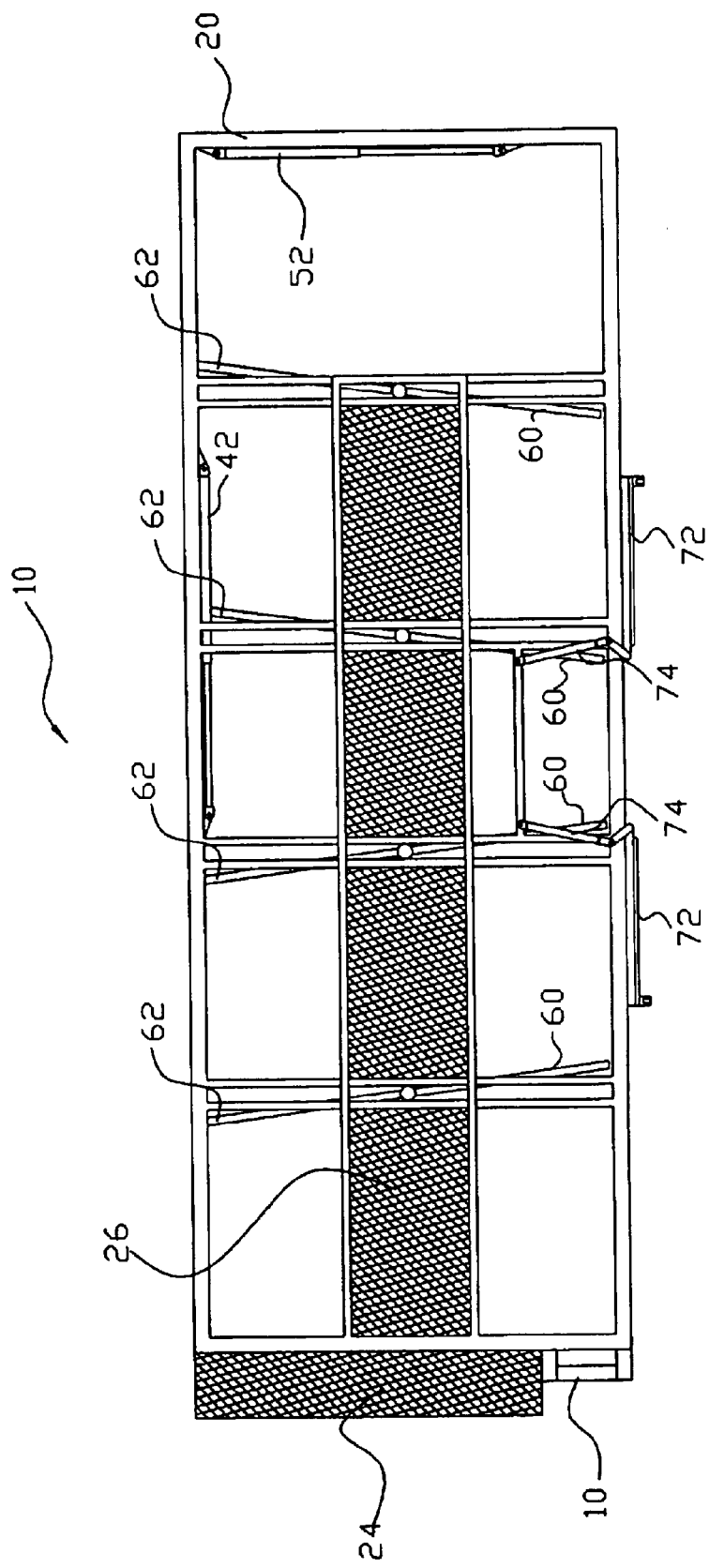
FIG. 3 is a top view of the present invention with the gates closed within.
Figure 4:
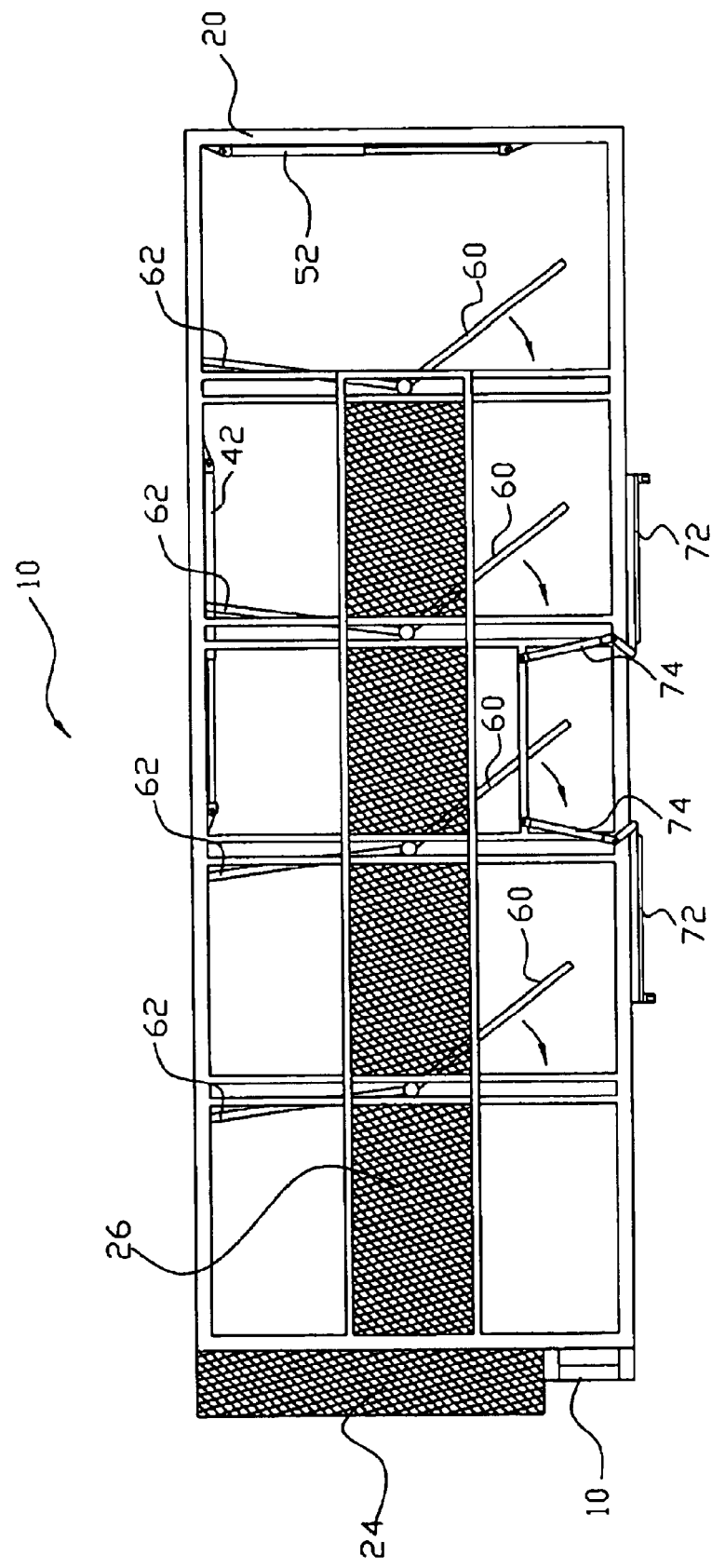
FIG. 4 is a top view of the present invention with the gates opened within.
Figure 5:
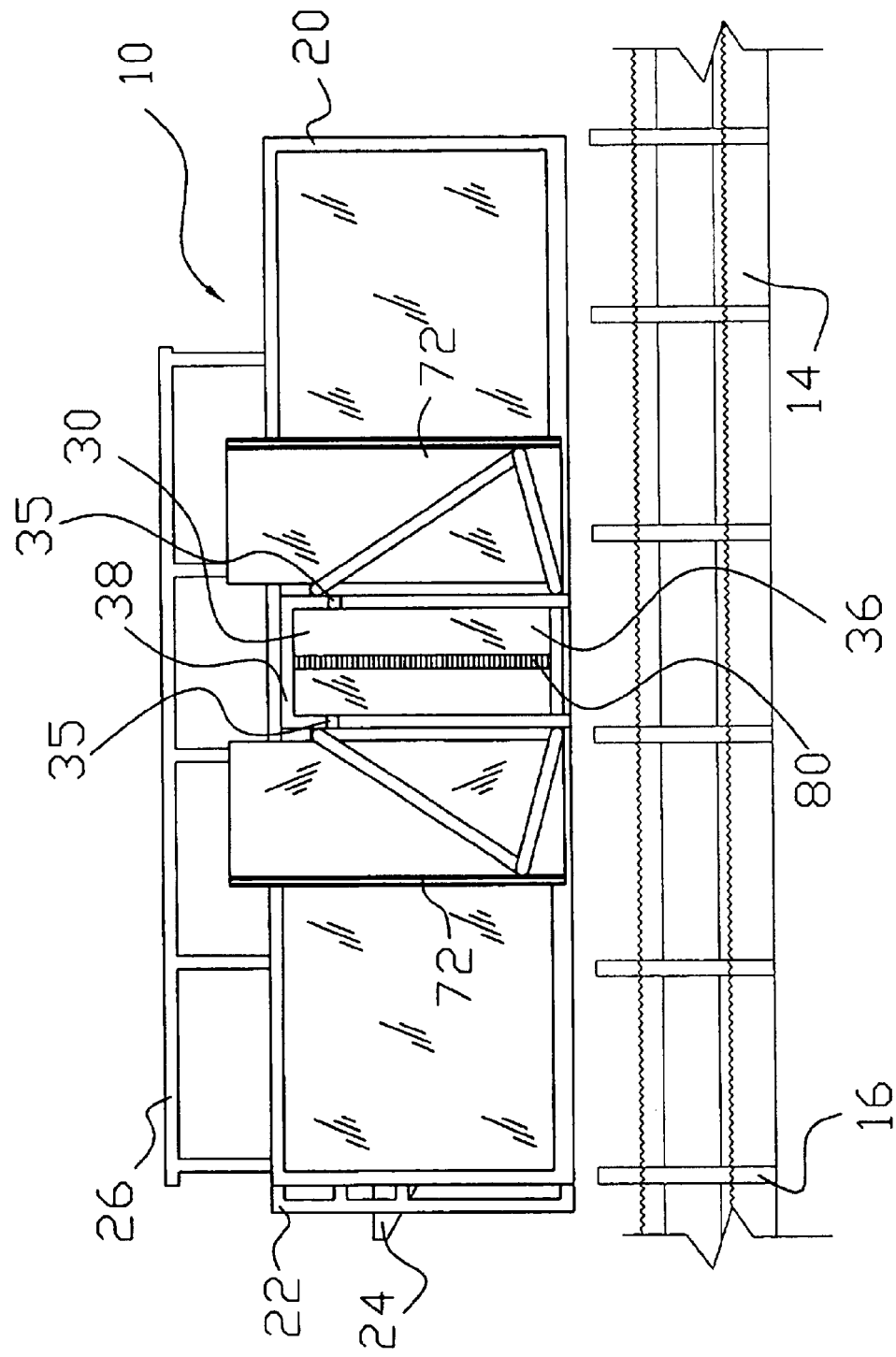
FIG. 5 is a left side view of the present invention.

As shown in FIG. 2 of the drawings, at least one side door 40 is positioned within the frame 20 for allowing the entry and exiting of animals from a heightened area such as a dock. It can be appreciated that the side door 40 is merely optional and is not a required element of the present invention. The side door 40 may be opened and closed by a third cylinder 42 as shown in FIGS. 3 and 4 of the drawings. The third cylinder 42 is preferably comprised of a hydraulic cylinder, however various types of actuator devices may be utilized to manipulate the side door 40.

As shown in FIG. 1 of the drawings, at least one rear door 50 is positioned within the frame 20 for allowing the entry and exiting of animals from a heightened area such as a dock. The rear door 50 may be opened and closed by fourth cylinder 52 as shown in FIGS. 3 and 4 of the drawings. As with the third cylinder 42, the fourth cylinder 52 is preferably comprised of a hydraulic cylinder, however various types of actuator devices may be utilized to manipulate the side door 40.

As further shown in FIGS. 3 and 4 of the drawings, a plurality of inner partitions 62 are positioned within the frame 20 for creating separate holding pens for the animals. In addition, a plurality of inner doors 60 are positioned within the interior portion of the frame 20 for allowing guiding, grouping, positioning, and separating of the animals within. The inner doors 60 are preferably manipulated by actuator devices such as hydraulic cylinders or the like. Various configurations may be utilized to construct the holding pens within the frame 20 of the animal transporting system 10 as can be appreciated by one skilled in the art. The inner doors 60 and the inner partitions 62 are arranged so that animals positioned within will stay separated and guided to the desired location.

As further shown in FIGS. 1 through 4 of the drawings, a catwalk 26 is preferably positioned upon the upper portion of the frame 20 to allow an individual to view the interior contents of the frame 20. A front platform 24 is also preferably attached to the side of the frame 20 as shown in FIGS. 2 through 4 of the drawings. A ladder 22 is attached to the side of the frame 20 adjacent the front platform 24 for allowing access to the front platform 24 and the catwalk 26 for an individual.

As shown in FIGS. 1 and 5 through 10 of the drawings, a ramp 30 is slidably positioned within an opening within the frame 20 preferably opposite of the side door 40. The ramp 30 is comprised of a first portion 32, a second portion 34 and a third portion 36 interconnected to one another. A support member 38 extends upwardly from the first portion 32 of the ramp 30 for providing support to the doors 70.

As shown in FIGS. 8 through 10 of the drawings, the first portion 32 of the ramp 30 is slidably positioned within the frame 20. The first portion 32 represents a horizontal deck when extended from the frame 20 as best shown in FIG. 10 of the drawings. The first portion 32 is slidably supported within the frame 20 by a slide rail system or similar structure commonly utilized. An actuator device such as a hydraulic cylinder extends and retracts the first portion 32 of the ramp 30 with respect to the frame 20 as shown in FIG. 7 of the drawings.

As shown in FIGS. 8 and 9 of the drawings, a second portion 34 of the ramp 30 is pivotally attached to the distal portion of the first portion 32 of the ramp 30. The second portion 34 is capable of being pivoted downwardly with respect to the first portion 32 and a ground surface as shown in FIGS. 9 and 10 of the drawings. One or more first cylinders 37 are mechanically attached between the first portion 32 and the second portion 34 for manipulating the second portion 34 with respect to the first portion 32 of the ramp 30 as shown in FIGS. 7 through 10 of the drawings.

As further shown in FIGS. 10 and 11 of the drawings, the third portion 36 of the ramp 30 is slidably positioned within the second portion 34. As best shown in FIG. 10 of the drawings, the second portion 34 is extendable from the second portion 34 of the ramp 30 to engage a ground surface for loading and unloading animals into the animal transporting system 10. A compression spring 80 is preferably attached between the inner end of the third portion 36 and the distal end of the second portion 34 for assisting in extending the third portion 36 from within the second portion 34 when the second portion 34 is pivoted outwardly from the first cylinders 37.

Figure 12:
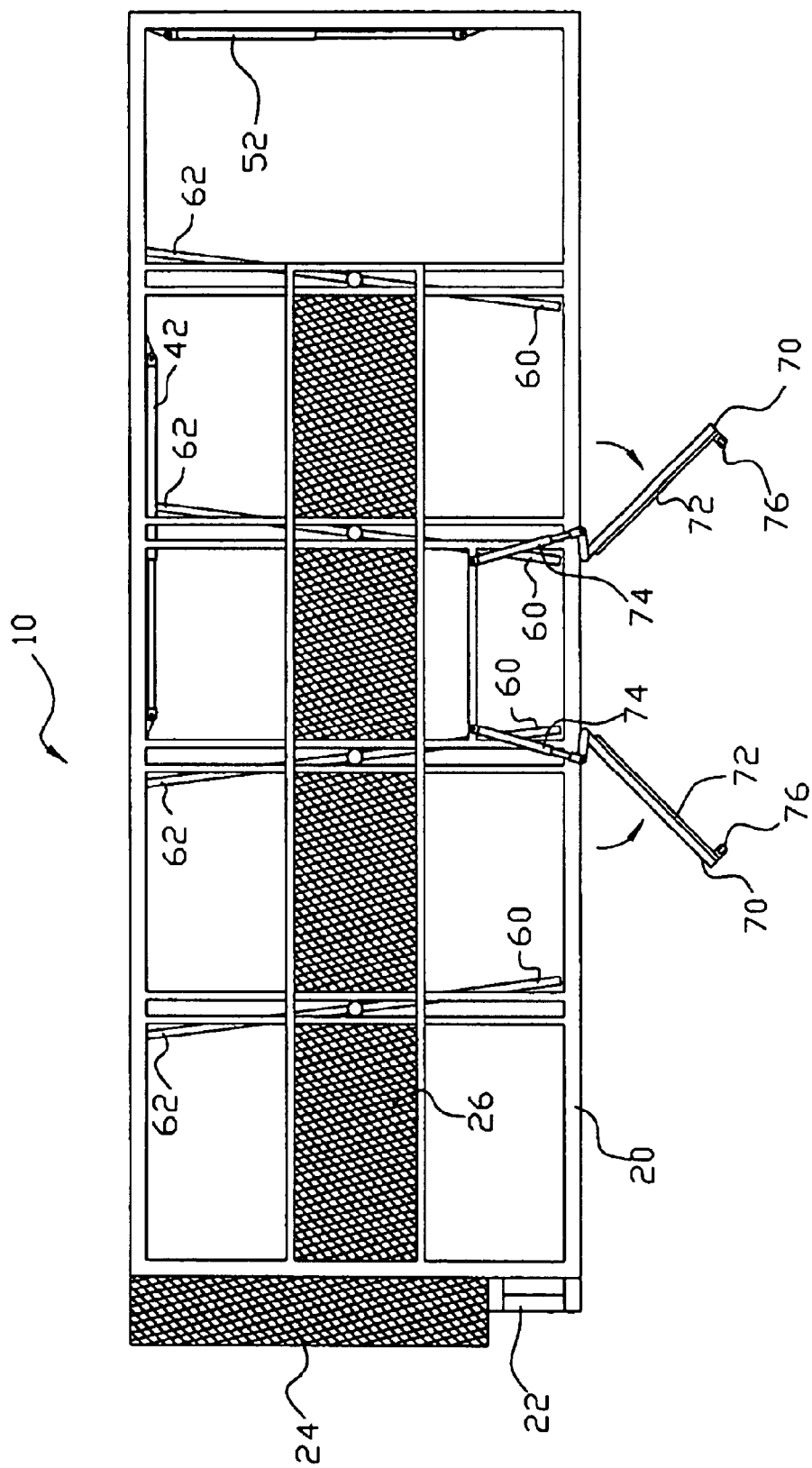
FIG. 12 is a top view of the present invention with the first doors and the second doors being pivoted inwardly.
Figure 13:
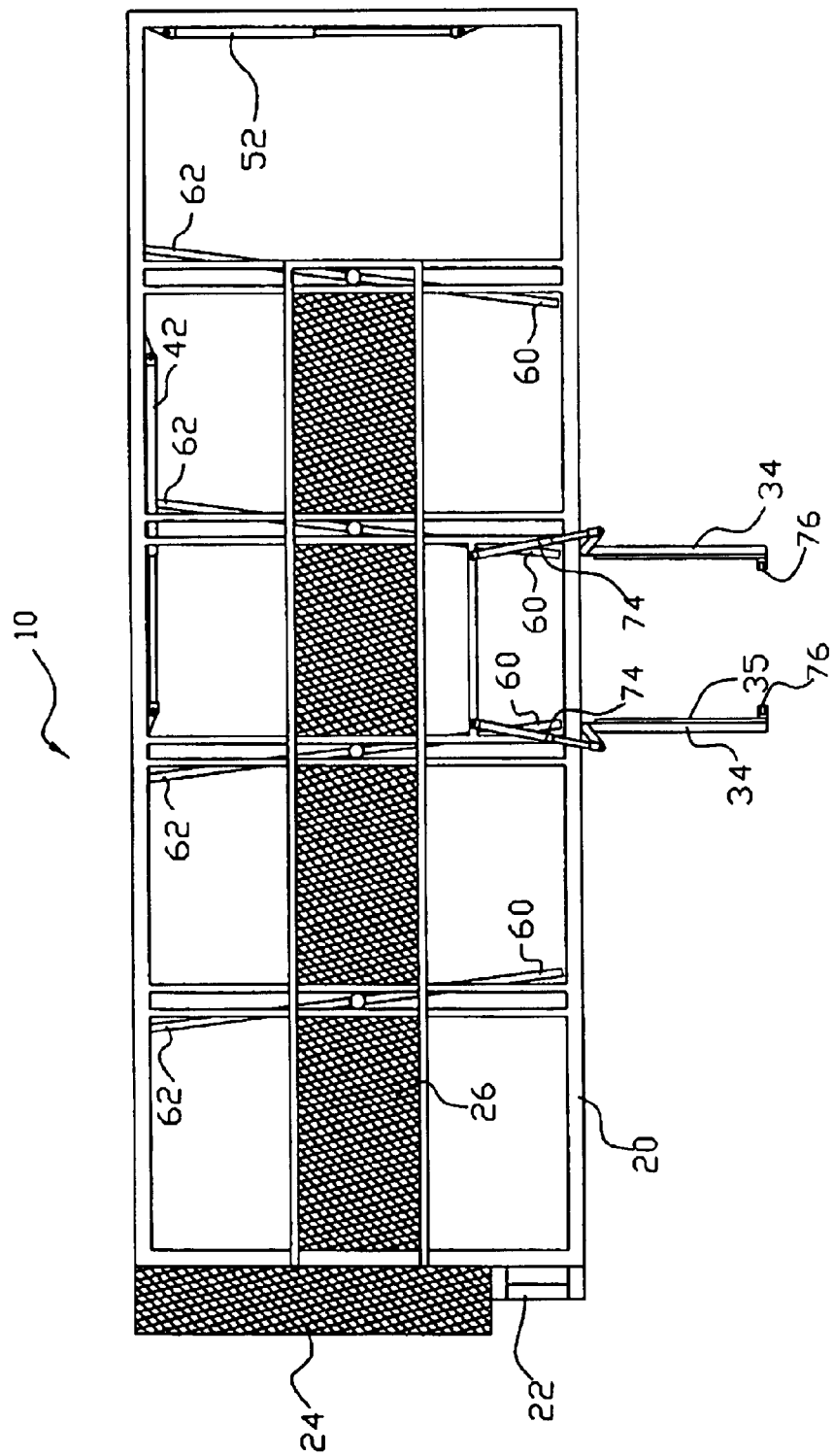
FIG. 13 is a top view with the first doors and the second doors extended orthogonally from the frame.

As shown in FIGS. 11 through 13 of the drawings, a pair of first doors 70 are pivotally attached to the frame 20 about the opening that receives the ramp 30. The first doors 70 have a horizontal plane of movement having a closed state adjacent the side walls of the frame 20 and an open state on opposing sides of the ramp 30. A pair of second cylinders 74 are connected between the frame 20 and the first doors 70 for pivoting the first doors 70 with respect to the frame 20 as best shown in FIGS. 12 and 13 of the drawings. The second cylinders 74 may be comprised of any well-known actuator device.

Figure 15:
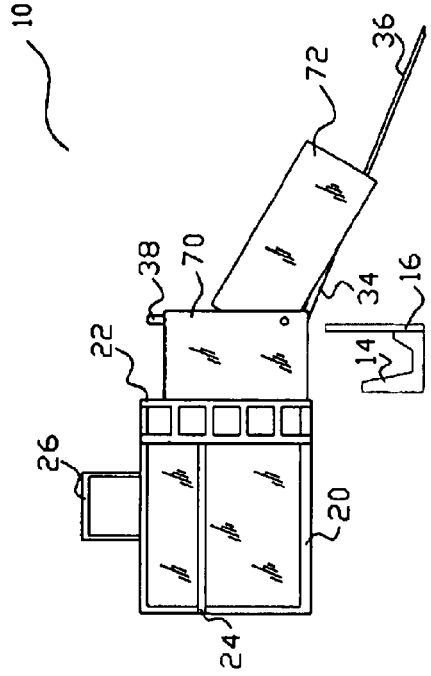
FIG. 15 is a rear view of the present invention showing the second doors being extended with respect to the first doors.
Figure 16:
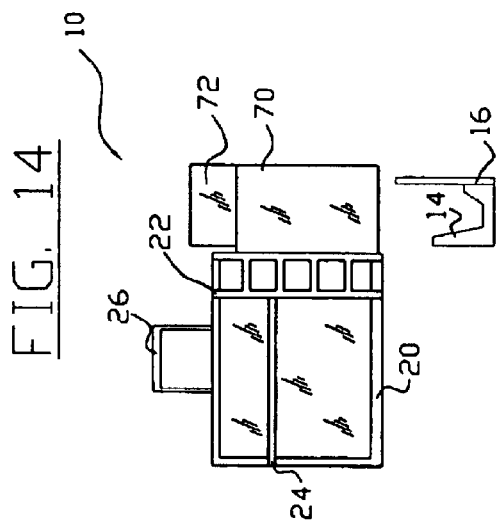
FIG. 16 is a rear view of the present invention showing the second doors being extended with respect to the first doors.
Figure 17:
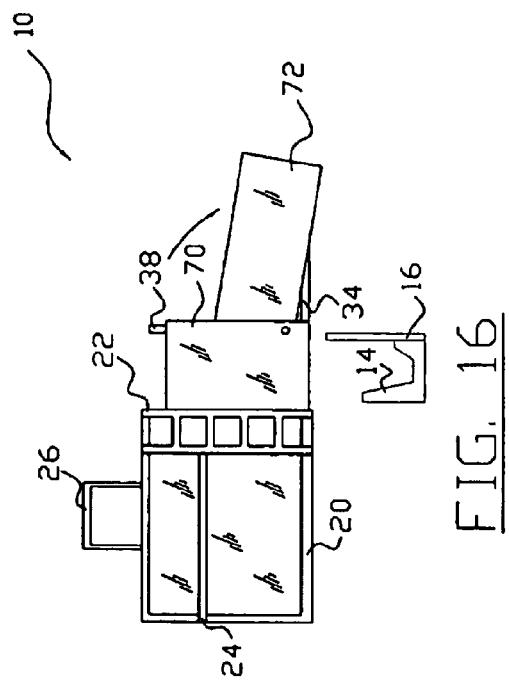
FIG. 17 is a rear view of the present invention showing the second doors fully extended along side the ramp.

As best shown in FIGS. 15 through 17 of the drawings, a pair of second doors 72 are pivotally attached to the first doors 70. A pair of engaging rails 76 are attached to the outer portions of the second doors 72 that receive guide pins 35 attached to the distal portions of the second portion 34 of the ramp 30. A pair of slots 78 within the engaging rails 76 allow the guide pins 35 from the second portion 34 to extend into and out from the engaging rails 76 as shown in FIG. 11 of the drawings.

Figure 19:
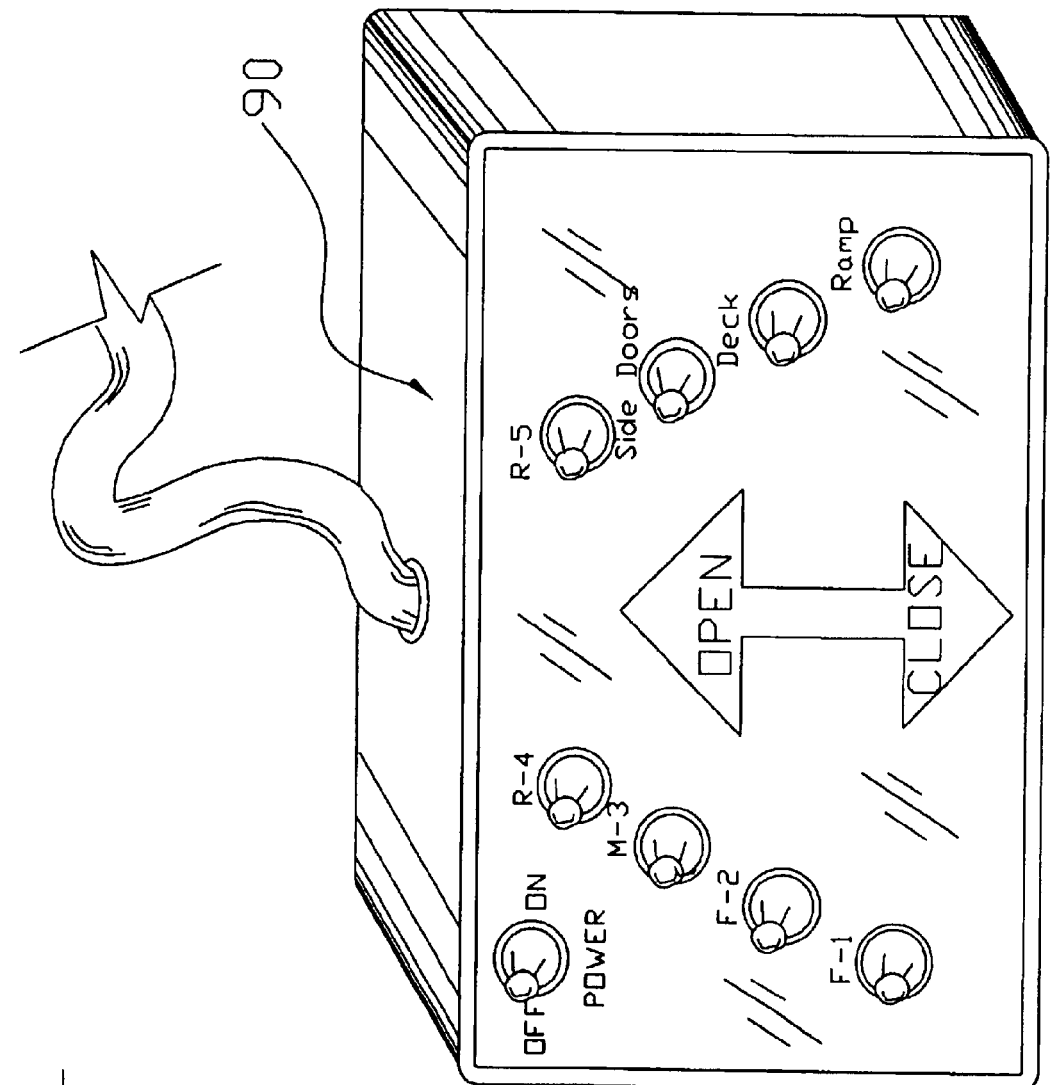
FIG. 19 is a top view of the control unit.

As shown in FIG. 19 of the drawings, at least one central control unit 90 is utilized to control the actuators and/or cylinders utilized upon the animal transporting system 10. The control unit 90 includes a plurality of switches commonly utilized to open and close hydraulic valves fluidly connected to the cylinders. Since control units 90 are commonly utilized no further explanation is required.

Figure 20:
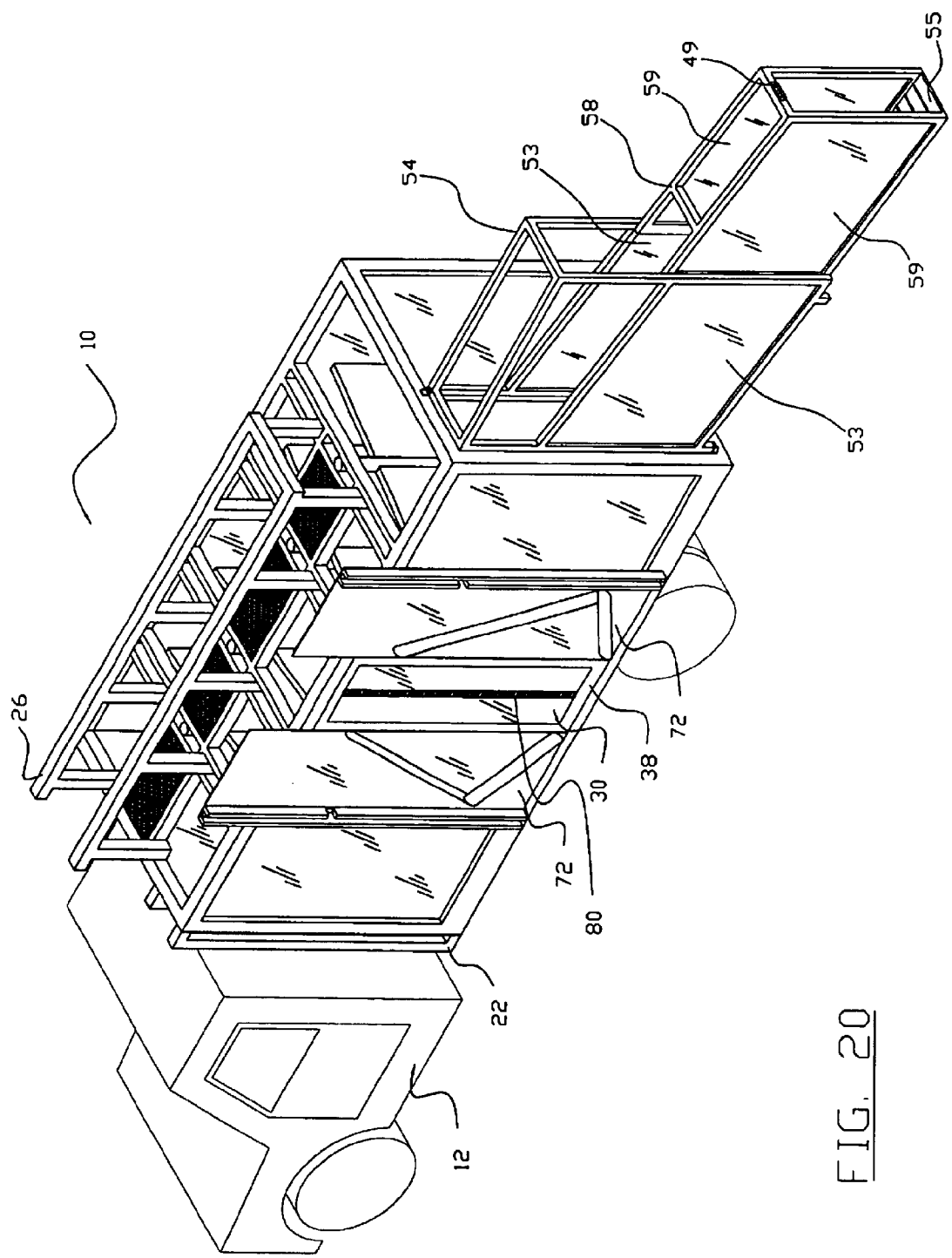
FIG. 20 is a left rear upper perspective view of an alternative embodiment illustrating a rear ramp structure fully extended for loading animals from ground level.
Figure 21:
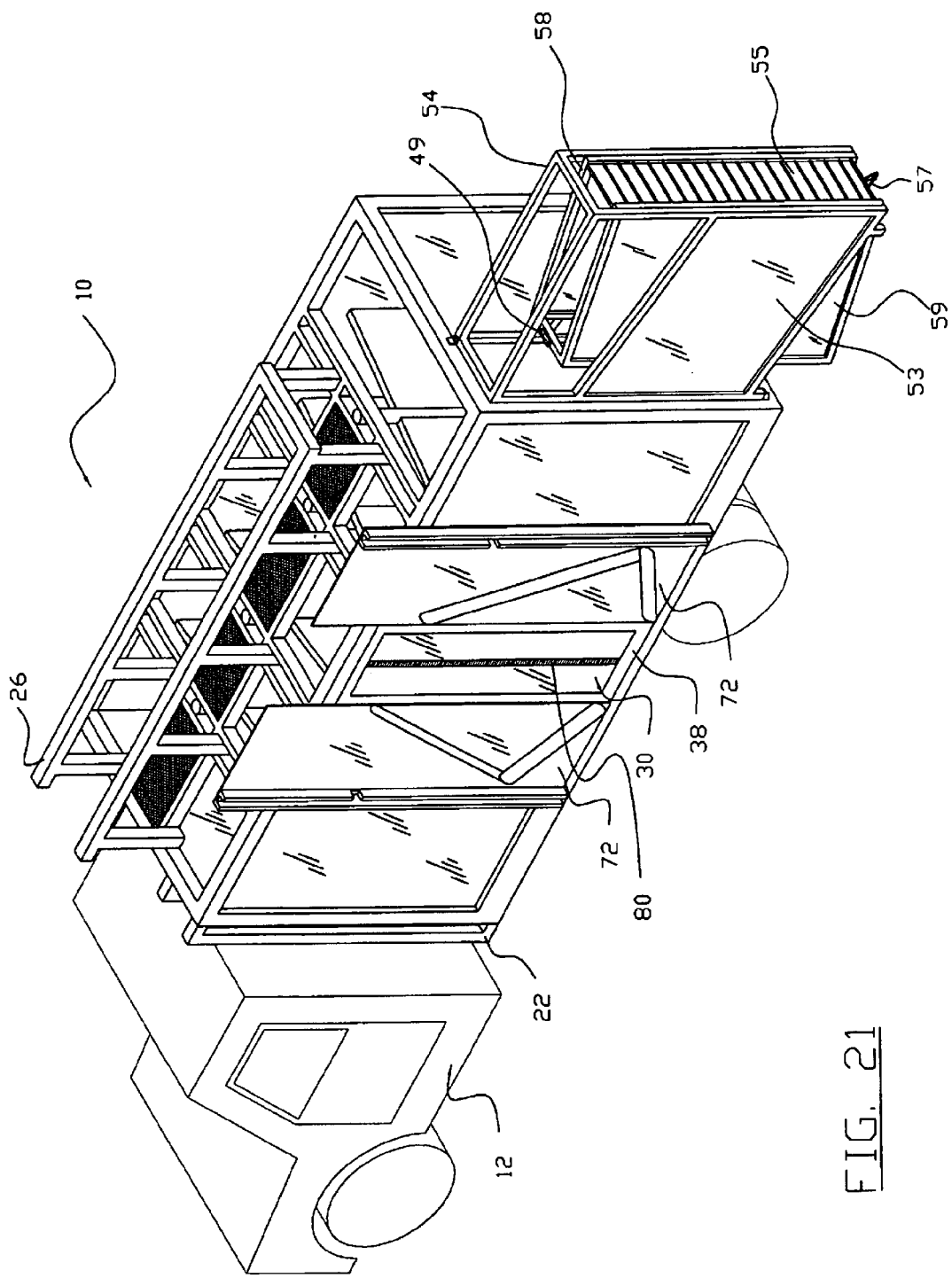
FIG. 21 is a left rear upper perspective view of an alternative embodiment illustrating a rear ramp structure partially folded.
Figure 22:
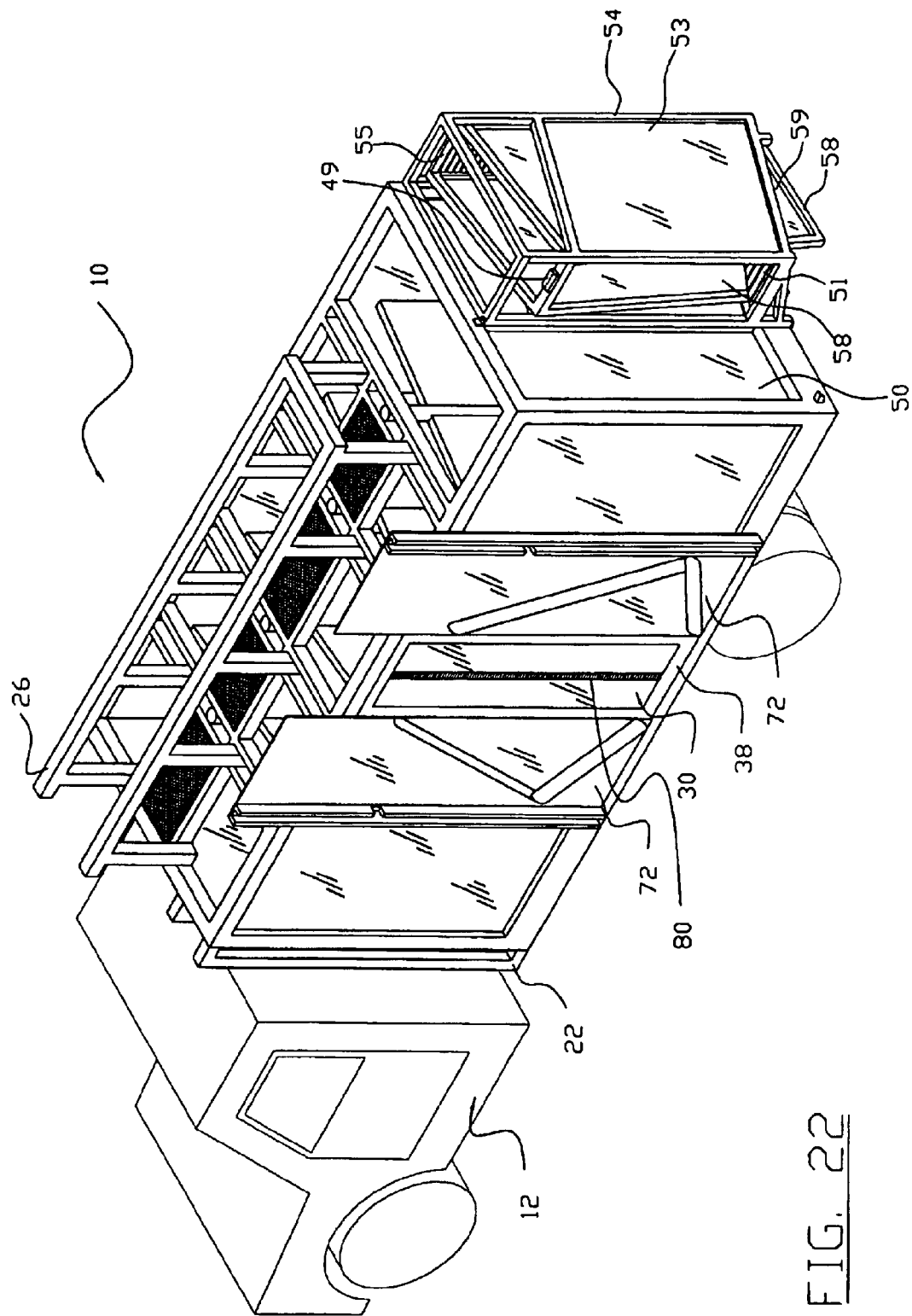
FIG. 22 is a left rear upper perspective view of an alternative embodiment illustrating a rear ramp structure completed folded and positioned within a storage position with respect to the frame.
Figure 23:
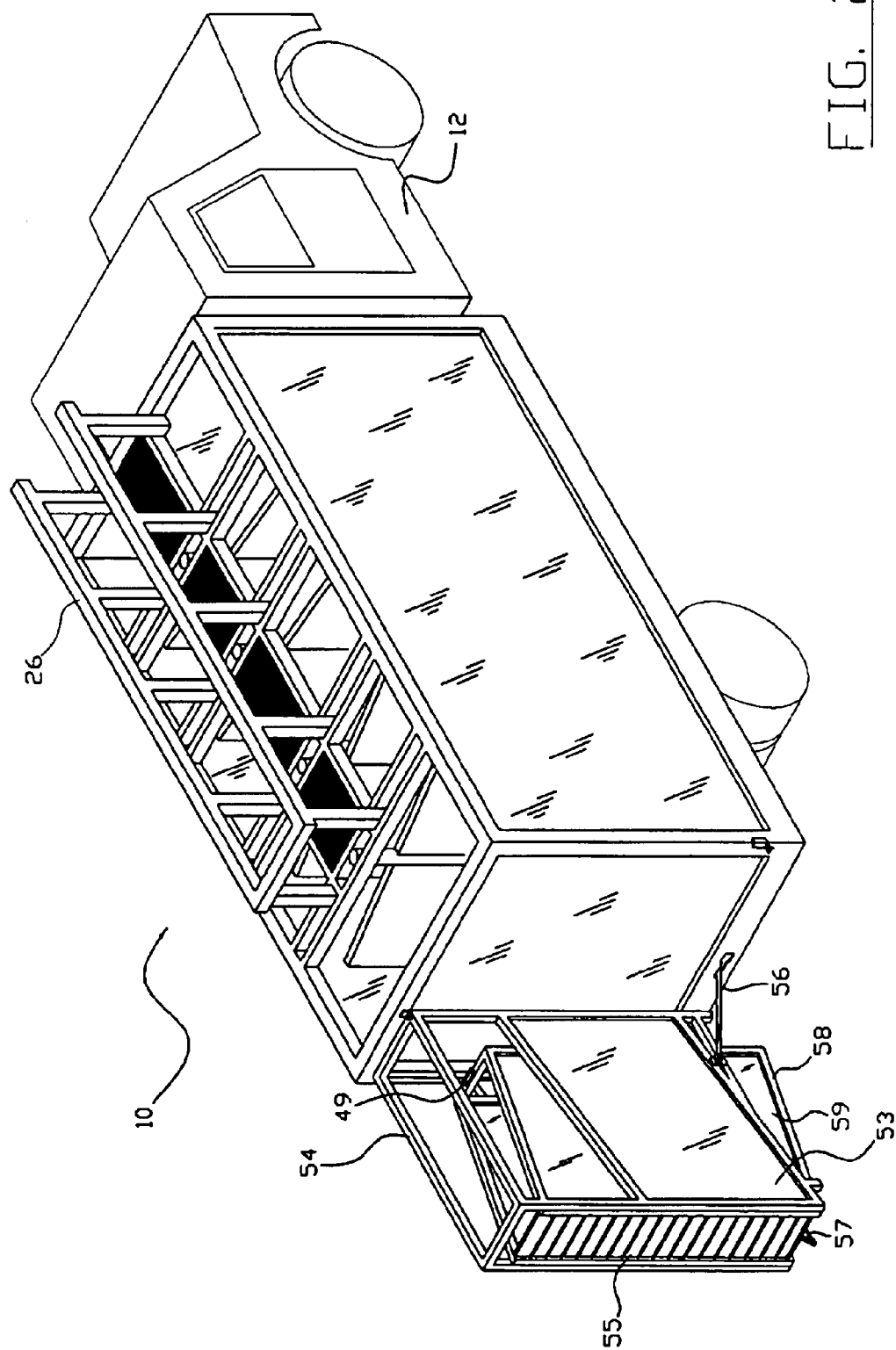
FIG. 23 is a right rear upper perspective view of an alternative embodiment illustrating a rear ramp structure partially folded.
Figure 24:
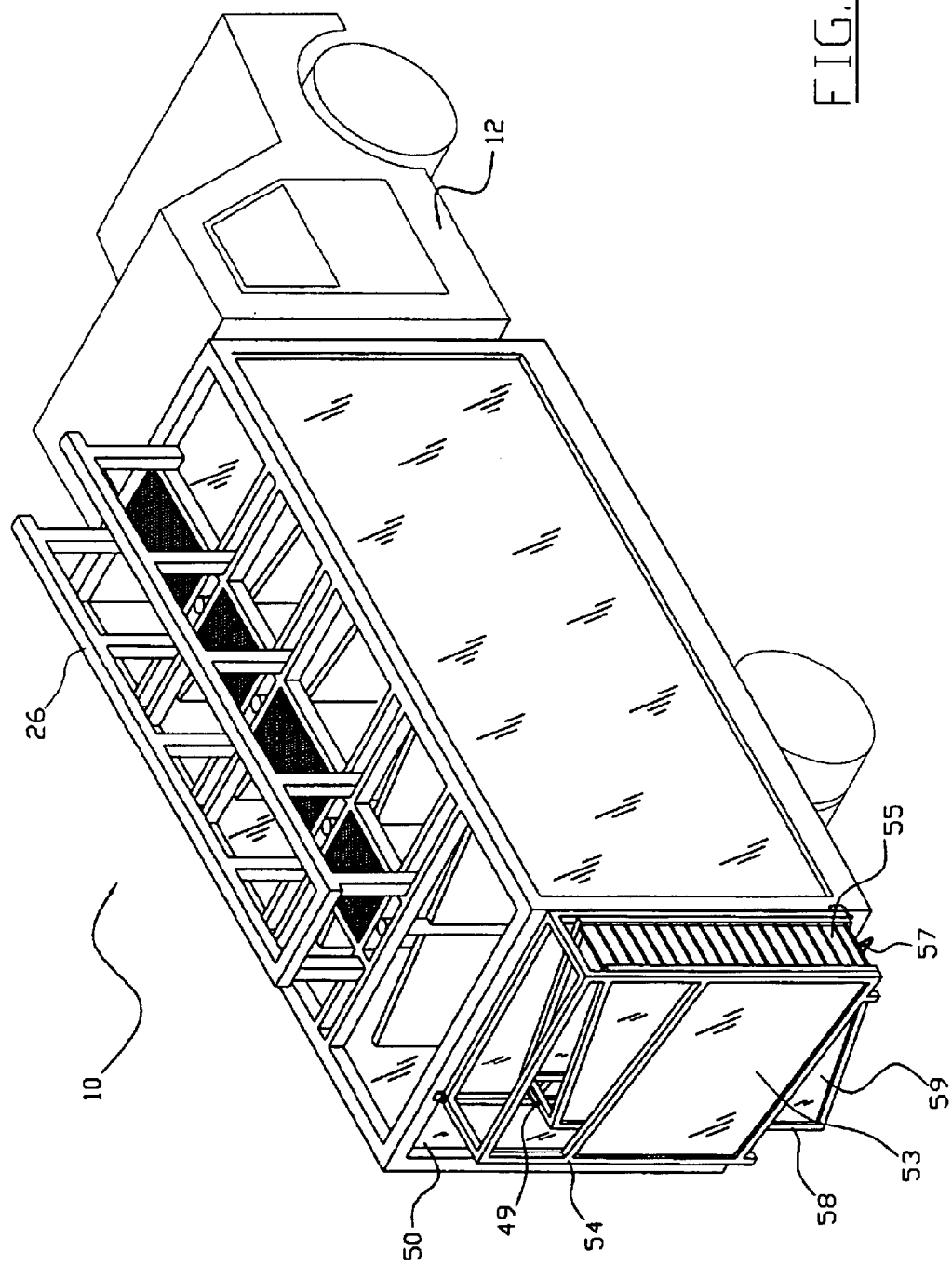
FIG. 24 is a right rear upper perspective view of an alternative embodiment illustrating a rear ramp structure completed folded and positioned within a storage position with respect to the frame.

FIGS. 20 through 27 illustrate the usage of a rear ramp structure attached to the rear of the frame 20 adjacent to the rear door 50. The rear ramp structure is comprised of a rear frame 54 pivotally attached to the frame 20 pivoting along a horizontal plane. As best illustrated in FIG. 22, only one side of the rear frame 54 is pivotally attached to the frame 20. A rear frame cylinder 56 is attached between the frame 20 and the rear frame 54 for extending and contracting the rear frame 54 with respect to the rear portion of the frame 20. The rear frame 54 has a rear floor and a pair of opposing rear sidewalls 53 that guide the animals from and to the rear door 50 as best illustrated in FIGS. 20 and 21 of the drawings.

Figure 25:
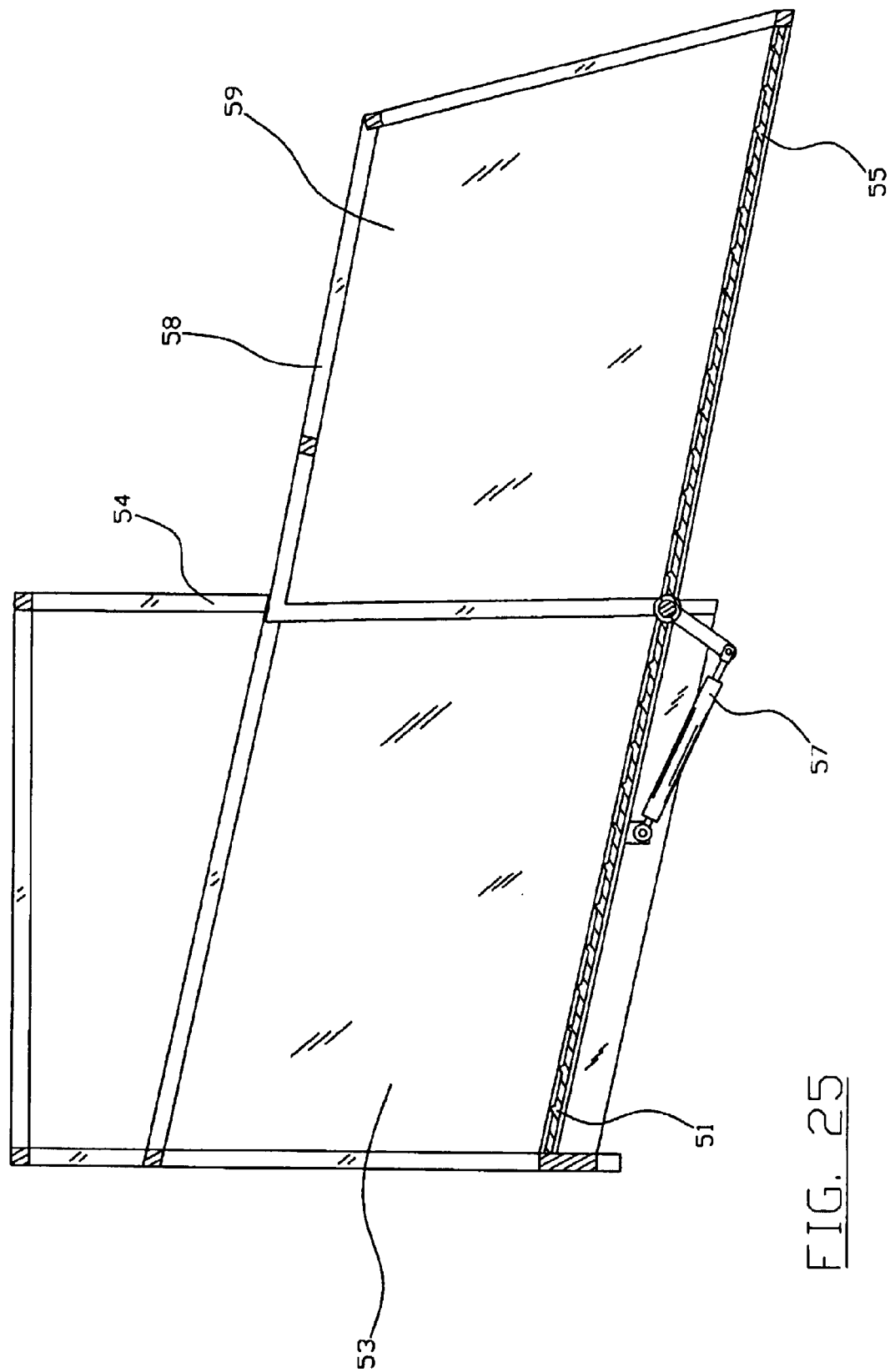
FIG. 25 is a side cutaway view of the alternative embodiment illustrating the rear ramp structure fully extended for loading animals from ground level.
Figure 26:
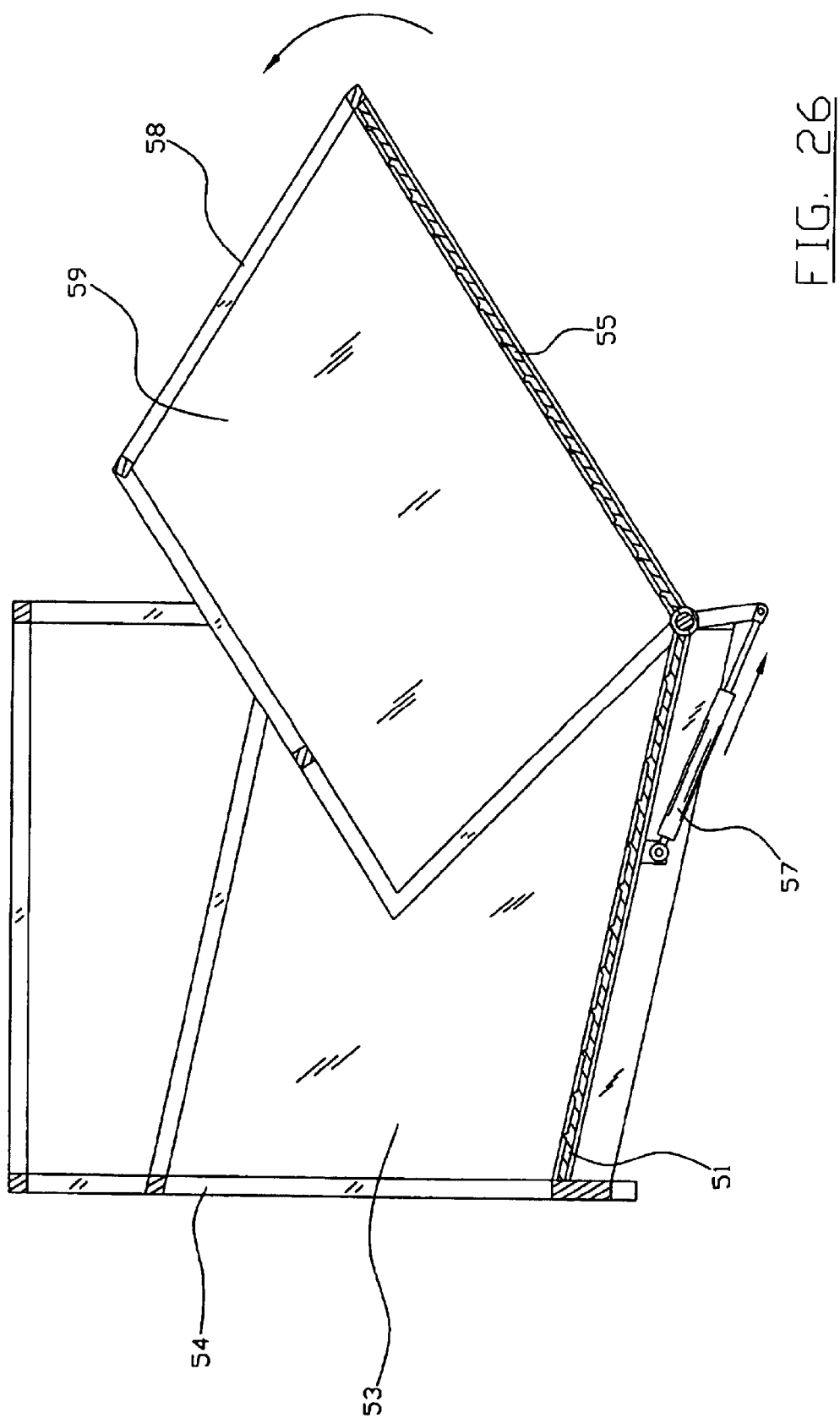
FIG. 26 is a side cutaway view of the alternative embodiment illustrating the rear ramp partially folded within the rear frame of the rear ramp structure.
Figure 27:
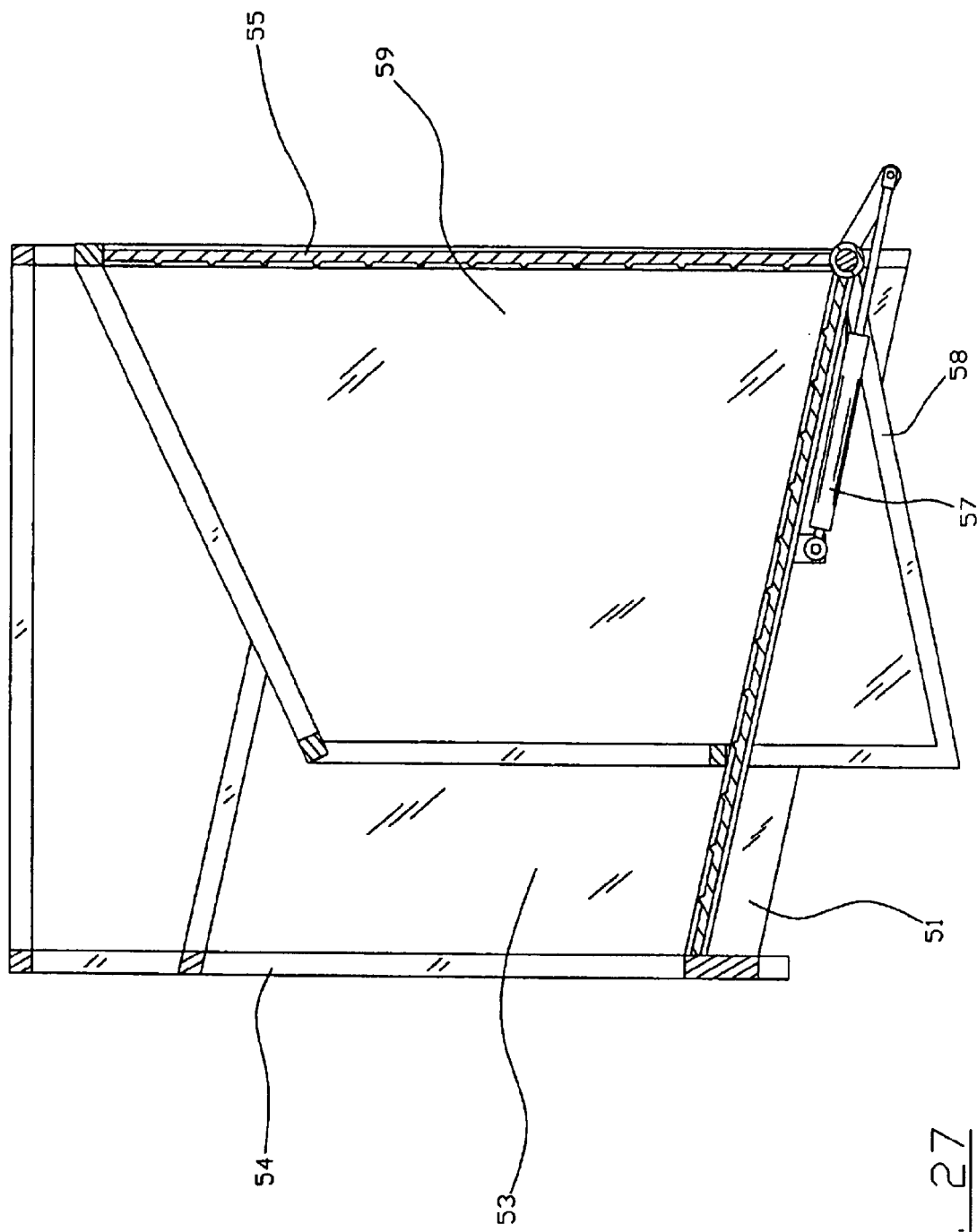
FIG. 27 is a side cutaway view of the alternative embodiment illustrating the rear ramp completely folded within the rear frame of the rear ramp structure.

As shown in FIGS. 25 through 27 of the drawings, the rear floor 51 preferably is declined from the frame 20 in a rearward manner. The rear floor 51 preferably includes a gripping material or structure for assisting animals during their travel upon the rear floor.

As shown in FIGS. 20 through 27 of the drawings, a rear ramp frame 58 is pivotally attached to a distal end of the rear frame 54 and is pivotal along a vertical plane. A rear ramp 55 and a pair of opposing rear ramp sidewalls 59 are attached to the rear ramp frame 58 for guiding the animals. A rear floor cylinder 57 is connected between the rear frame 54 and the rear ramp frame 58 for pivoting the rear ramp frame 58 with respect to the rear frame 54 as best illustrated in FIG. 26 of the drawings.

As shown in FIG. 20 of the drawings, a rear control unit 49 is positioned upon the rear ramp frame 58 which allows for the controlling of the rear ramp structure. Using the rear control unit 49 or the main control unit 90, the user is able to control the pressurized fluid to the rear frame cylinder 56 and the rear floor cylinder 57. When the operator desires to load or unload animals through the rear door 50 onto a ground level surface, the operator manipulates the rear control unit 49 such that the rear frame cylinder 56 forces the rear frame 54 outwardly so as to extend substantially rearwardly and substantially surrounding the rear door 50 as shown in FIG. 21 of the drawings. The user then manipulates the rear control unit 49 to cause the rear floor cylinder 57 to pivot the rear ramp frame 58 outwardly from the rear frame 54 as shown in FIGS. 20 and 25 of the drawings. As best illustrated in FIG. 25 of the drawings, the rear floor 51 and the rear ramp 55 preferably form a substantially continuous surface for the animals to walk upon.

Figure 14:
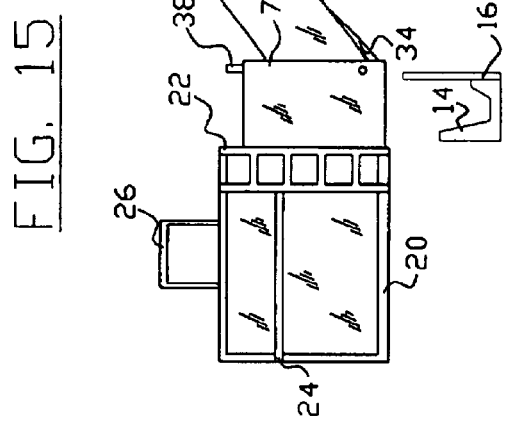
FIG. 14 is a rear view with the first doors fully extended and the second doors in a retracted position.
Figure 18:
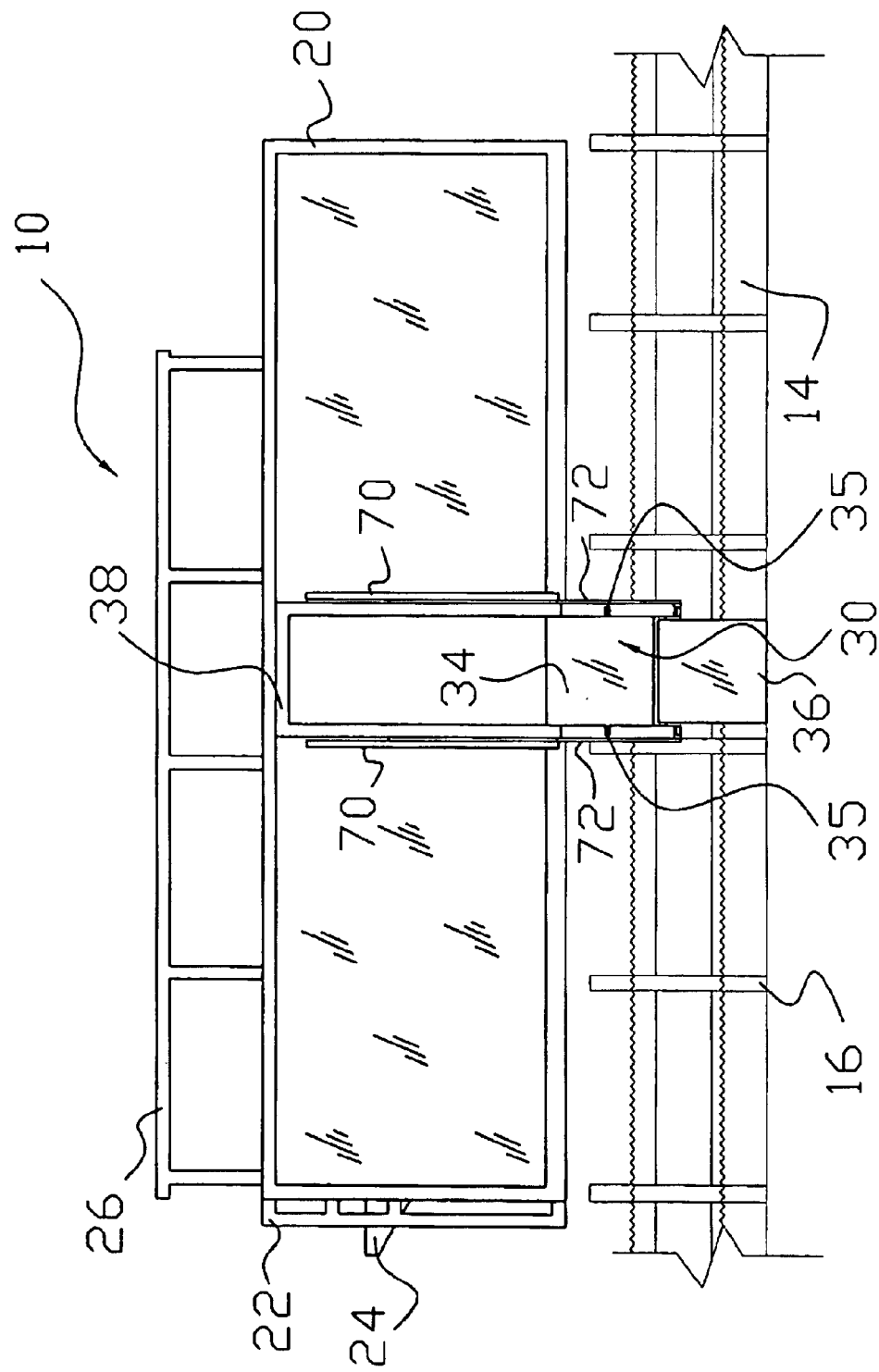
FIG. 18 is a left side view of the present invention showing the ramp, the first doors and the second doors fully extended.

In use, the user positions the side of the animal transporting system adjacent a feedlot pen or other animal holding area. The user then actuates the control unit 90 so that the first doors 70 are manipulated inwardly toward one another as shown in FIGS. 12 through 14 of the drawings. As best shown in FIG. 7 of the drawings, once the first doors 70 are fully extended outwardly with respect to the frame 20 the ramp 30 is then extended outwardly along a horizontal plane with the distal end of the first portion 32 extending a distance above and beyond a feed bunk 14 and/or fence 16. The guide pins 35 attached to the vertically oriented second portion 34 of the ramp 30 pass through the slots 78 within the engaging rails 76 so that the guide pins 35 are properly positioned within the engaging rails 76. When the pair of first doors 70 are fully extended, the first portion 32 is completely enclosed with the second portion 34 and third portion 36 blocking the front portion of the opening from the frame 20. After the first portion 32 of the ramp 30 is fully extended, the second portion 34 is pivoted outwardly simultaneously having the guide pins 35 slidably extend within the engaging rails 76 and simultaneously pivot the second doors 72 with respect to the first doors 70 as shown in FIG. 15 of the drawings. When the second portion 34 of the ramp 30 is substantially horizontal, the spring 80 begins to force the third portion 36 outwardly from within the second portion 34 of the ramp 30. When the second portion 34 of the ramp 30 is inclined downwardly, the third portion 36 is extended outwardly from the second portion 34 until the distal end of the third portion 36 is in engagement with the ground surface as shown in FIG. 17 of the drawings. The second doors 72 completely surround the second portion 34 and a portion of the third portion 36 of the ramp 30 as shown in FIGS. 17 and 18 of the drawings. The individual then may load or unload animals into the animal transporting system 10 as desired. During loading or unloading, the animals are guided by the inner doors 60 and inner partitions 60 to the desired location depending upon the position of the inner doors 60. When the individual is finished, the above process is simply reversed until the ramp 30 is returned into the frame 20 and the doors 70, 72 are adjacent the side of the frame 20 as shown in FIG. 1 of the drawings.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal transporting system for loading, transporting and unloading one or more animals, comprising:
   a first frame attached to a vehicle, wherein an interior portion of said first frame is capable of receiving at least one animal;
   a rear opening within said first frame;
   a rear ramp structure extendably attached to said first frame, wherein said rear ramp structure comprises:
      a rear frame having a pair of rear sidewalls and a rear floor pivotally attached to said first frame, wherein said rear frame is pivotally movable along a horizontal plane;
      a rear frame actuator connected between said first frame and said rear frame for actuating pivoting of said rear frame;
      a rear ramp frame having a pair of rear ramp sidewalls and a rear ramp floor pivotally attached to said rear frame, wherein said rear ramp frame is movable along a vertical plane; and
      a rear floor actuator connected between said rear frame and said rear ramp frame for actuating pivoting of said rear ramp frame.

2. The animal transporting system of claim 1, including a second opening within said first frame and a second ramp extendably positioned within said second opening and said first frame, wherein said second ramp is comprised of:
   a first portion slidably positioned within said first frame, wherein said first portion has a horizontal movement; and a second portion pivotally attached to a distal portion of said first portion.

3. The animal transporting system of claim 2, wherein said second ramp further includes a third portion slidably positioned within said second portion.

4. The animal transporting system of claim 3, including a spring attached between said second portion and said third portion.

5. The animal transporting system of claim 1, wherein said first frame includes at least one door and a plurality of inner partitions and inner doors, wherein said plurality of inner doors are mechanically movable with hydraulic cylinders.

6. The animal transporting system of claim 5, including at least one actuator connected to said first frame and said at least one door.

7. The animal transporting system of claim 1, including a rear control unit for controlling said rear frame actuator and said rear floor actuator.

8. An animal transporting system for loading, transporting and unloading one or more animals, comprising:

a first frame attached to a vehicle, wherein an interior portion of said first frame is capable of receiving at least one animal;

a rear opening within said first frame;

a rear ramp structure extendably attached to said first frame, wherein said rear ramp structure comprises:

a rear frame having a pair of rear sidewalls and a rear floor pivotally attached to said first frame, wherein said rear frame is pivotally movable along a horizontal plane;

a rear frame actuator connected between said frame and said rear frame for actuating pivoting of said rear frame;

a rear ramp frame having a pair of rear ramp sidewalls and a rear ramp floor pivotally attached to said rear frame, wherein said rear ramp frame is movable along a vertical plane; and a rear floor actuator connected between said rear frame and said rear ramp frame for actuating pivoting of said rear ramp frame;

a second opening within said frame;

a second ramp extendably positioned within said second opening and said frame, wherein said second ramp is comprised of:

a first portion slidably positioned within said frame, wherein said first portion has a horizontal movement; and a second portion pivotally attached to a distal portion of said first portion;

wherein said second ramp further includes a third portion slidably positioned within said second portion and a spring attached between said second portion and said third portion;

wherein said frame includes at least one door and a plurality of inner partitions and inner doors, wherein said plurality of inner doors are mechanically movable with hydraulic cylinders;

at least one actuator connected to said first frame and said at least one door;

a rear control unit for controlling said rear frame actuator and said rear floor actuator.

\* \* \* \* \*